US011951776B2

(12) United States Patent
Sakamoto

(10) Patent No.: US 11,951,776 B2
(45) Date of Patent: Apr. 9, 2024

(54) PNEUMATIC TIRE

(71) Applicant: The Yokohama Rubber Co., LTD., Tokyo (JP)

(72) Inventor: Yousuke Sakamoto, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 314 days.

(21) Appl. No.: 17/275,525

(22) PCT Filed: Sep. 11, 2019

(86) PCT No.: PCT/JP2019/035723
§ 371 (c)(1),
(2) Date: Mar. 11, 2021

(87) PCT Pub. No.: WO2020/054769
PCT Pub. Date: Mar. 19, 2020

(65) Prior Publication Data
US 2022/0111681 A1     Apr. 14, 2022

(30) Foreign Application Priority Data
Sep. 14, 2018  (JP) ................. 2018-172762

(51) Int. Cl.
*B60C 13/02*  (2006.01)
*B60C 11/01*  (2006.01)
*B60C 11/13*  (2006.01)

(52) U.S. Cl.
CPC .............. *B60C 13/02* (2013.01); *B60C 11/01* (2013.01); *B60C 2011/1361* (2013.01)

(58) Field of Classification Search
CPC .......... B60C 13/02; B60C 11/01; B60C 13/00
See application file for complete search history.

(56) References Cited

U.S. PATENT DOCUMENTS

D777,095 S  *  1/2017  Sato ............................ D12/605
D778,233 S  *  2/2017  Kuwano ..................... D12/605
(Continued)

FOREIGN PATENT DOCUMENTS

AT         507094 T       5/2011
AU      2009208076 A      8/2009
(Continued)

*Primary Examiner* — Robert C Dye
*Assistant Examiner* — Nicholas J Weiler
(74) *Attorney, Agent, or Firm* — Thorpe North & Western

(57) ABSTRACT

A pneumatic tire includes a block group including shoulder blocks adjacent to each other with a shoulder lug groove therebetween and side blocks adjacent to each other with a side groove positioned on an extension of a shoulder lug groove between the shoulder blocks. Contour lines of side surfaces of the shoulder blocks on the outer side in the tire width direction and contour lines of the top surfaces of the side blocks extend on identical straight lines. Contour lines of the top surfaces of the side blocks, contour lines on a side away from the side groove between the side blocks, and contour lines of the narrow grooves formed on the side blocks each include straight portions extending along the tire radial direction on the side of the shoulder blocks and inclined portions extending in a converging manner toward the side groove between the side blocks.

10 Claims, 5 Drawing Sheets

(56) References Cited

U.S. PATENT DOCUMENTS

2009/0194212 A1  8/2009  Bonko et al.
2010/0043934 A1  2/2010  Harvey
2017/0166013 A1  6/2017  Kuwano

FOREIGN PATENT DOCUMENTS

| BR | PI0900925 A | 1/2009 |
|----|----|----|
| BR | PI0902751 A | 8/2009 |
| CN | 1803479 A | 7/2006 |
| CN | 101654044 A | 2/2010 |
| CN | 107031296 A | 8/2017 |
| CN | 109195816 A | 1/2019 |
| EP | 2156969 A1 | 2/2010 |
| JP | 2006-192959 A | 7/2006 |
| JP | 2010-47251 A | 3/2010 |
| JP | 2013-119277 A | 6/2013 |
| JP | 2016-007861 A | 1/2016 |
| JP | 2017-109543 A | 6/2017 |
| KR | 2019-0061406 A | 6/2019 |
| RU | 2395406 C | 7/2010 |
| WO | 2017/208862 A1 | 12/2017 |
| ZA | 200905737 A | 8/2009 |

\* cited by examiner

PNEUMATIC TIRE

TECHNICAL FIELD

The present technology relates to a pneumatic tire suitable as a tire used for driving on unpaved roads and in particular relates to a pneumatic tire providing enhanced driving performance on unpaved roads and enhanced cut resistance.

BACKGROUND ART

As a pneumatic tires used for driving on unpaved roads such as an uneven ground surface, a muddy ground surface, a snowy road, a sandy ground surface, and a rocky ground surface, a tire including a tread pattern, which mainly includes lug grooves or blocks having a large number of edge components and has a large groove area, is generally adopted. Furthermore, side blocks are provided in a side region more on the outer side in the tire width direction than a shoulder block positioned on the outermost side of a tread portion in a tire width direction. Such a tire has recesses and protrusions defined by grooves and blocks provided to the tread portion and the side region to achieve traction performance by biting mud, snow, sand, stones, rocks, or the like on a road surface (hereinafter, referred to collectively as "mud or the like") and has a large groove area to prevent grooves from being clogged with mud or the like, and thus provides improved driving performance on unpaved roads (for example, see Japan Unexamined Patent Publication Nos. 2016-007861 and 2013-119277 Patent Documents 1 and 2).

When comparing the tires of Japan Unexamined Patent Publication Nos. 2016-007861 and 2013-119277, the tire of Japan Unexamined Patent Publication No. 2016-007861 is a type of the tire that has a relatively small groove area and that is designed in consideration of driving performance on paved roads as well. On the other hand, the tire of Japan Unexamined Patent Publication No. 2013-119277 is a type of the tire that has a large groove area and large blocks, and is designed particularly in consideration of driving performance on unpaved roads. As a result, the former has inferior driving performance on unpaved roads to that of the latter, and the latter tends to have inferior performance at the time of normal driving to that of the former. In recent years, performance requirements for tires have become diverse, and tires for driving on unpaved roads, which have the intermediate level of performance between such two types of tires, have been demanded. Thus, for example, there has been a demand for a measure to optimize the shape of the grooves or blocks for the side region to effectively improve driving performance on unpaved roads. A failure such as a chip cut is likely to occur during driving on unpaved roads, and thus enhanced cut resistance has also been required in addition to excellent driving performance on unpaved roads as described above.

SUMMARY

The present technology provides a pneumatic tire that provides improved driving performance on unpaved roads and cut resistance.

A pneumatic tire of the present technology includes: a tread portion extending in a tire circumferential direction and having an annular shape; a pair of sidewall portions respectively disposed on both sides of the tread portion; and a pair of bead portions each disposed on an inner side of the pair of sidewall portions in a tire radial direction, the tread portion having a surface provided with a pair of main grooves on both sides of a tire equator that extend along the tire circumferential direction, shoulder regions, positioned on an outer side in a tire width direction of the main grooves, being provided with a plurality of shoulder lug grooves that are provided at an interval in the tire circumferential direction and extend from the main grooves toward the outer side in the tire width direction, and a plurality of shoulder blocks that are defined by the main grooves and the shoulder lug grooves and are arranged along the tire circumferential direction, side regions that are adjacent to outer sides in the tire width direction of the shoulder regions being provided with a plurality of side grooves that are extensions of the respective shoulder lug grooves and extend along the tire radial direction and a plurality of side blocks that are defined by the side grooves on the outer side in the tire width direction of each of the shoulder blocks and are raised from outer surfaces of the sidewall portions, side surfaces of the shoulder blocks on the outer side in the tire width direction and top surfaces of the side blocks each being provided with narrow grooves extending in the tire radial direction, the narrow grooves on the side surfaces of the shoulder blocks on the outer side in the tire width direction and on the top surfaces of the side block extending on identical straight lines, in each of block groups including a pair of shoulder blocks adjacent to each other with a shoulder lug groove provided in between and a pair of side blocks adjacent to each other with a side groove positioned on an extension of the shoulder lug groove between the pair of shoulder blocks provided in between, contour lines of side surfaces of the shoulder blocks on the outer side in the tire width direction and along the shoulder lug groove and contour lines of the top surfaces of the side blocks and along the side groove extending on identical straight lines, of the contour lines of the top surfaces of the side blocks and extending along the side grooves, contour lines on a side away from the side groove between the pair of side blocks, and contour lines of the narrow grooves formed on the side blocks each including straight portions extending along the tire radial direction on a side of the shoulder blocks and inclined portions connected to the inner side in the tire radial direction of the straight portions and extending in a converging manner toward the side groove between the pair of side blocks, the block groups being repeatedly arranged over an entire circumference.

In the present technology, as described above, the shoulder region and the side region are formed to be a pattern mainly including blocks, to improve the driving performance on unpaved roads. In this context, the positional relationship between contour lines, functioning as edge components in each block, is optimized between the blocks, whereby cut resistance can be improved while enhancing soil discharging performance. Specifically, the shoulder lug groove and the side groove, as well as the narrow groove provided to the shoulder block and the narrow groove provided to the side block extend on the identical straight line, whereby mud or the like in the grooves in the shoulder region and in the side region is efficiently discharged. The contour lines of the side blocks include the straight portions and the inclined portions, so that the side blocks have a tapered shape to be closer to the side lug groove at a portion more on the inner side in the tire radial direction. Thus, concentration of stress can be avoided and cut resistance can be improved. The contour line of the side block and the contour line of the narrow groove have a similar bent shape defined by the straight portions and the inclined portions, whereby excellent edge effect can be provided while maintaining the soil discharging performance. In the present technology, two contour lines of interest are regarded as being "on identical line" when an angle difference between the contour lines is within 15 degrees and a separation distance between facing ends of the two contour lines along the tire circumferential direction is not larger than 7 mm.

In the present technology, the straight portions included in each of the side blocks preferably extend in an identical direction with a contour line of the top surface of the side block on a side of the side groove with an angle difference in a range within 10 degrees, and the inclined portions included in each of the side blocks preferably extend in an identical direction with an angle difference in a range within 10 degrees. With the straight portions and the inclined portions of the contour lines included in a single side block thus extending substantially parallel with each other, mud or the like in the groove is smoothly discharged, whereby the soil discharging performance can be improved.

In the present technology, a groove bottom of each of the shoulder lug grooves is preferably provided with a shoulder protrusion that is raised from the groove bottom of each shoulder lug groove and extends along an extending direction of each shoulder lug groove, a groove bottom of each of the side grooves is preferably provided with a side protrusion that is raised from the groove bottom of each side groove and extends along an extending direction of each side groove, the shoulder protrusion and the side protrusion preferably extend on an identical line along the tire width direction, the shoulder protrusion and the side protrusion each preferably have a width that is equal to or larger than 1.5 mm and a raised height that is equal to or smaller than 3 mm, and the side protrusion is preferably terminated to be more on the outer side in the tire radial direction than a zigzag boundary line formed by connecting extensions of the inclined portions included in contour lines, of the contour lines of the top surfaces of the side blocks along the side groove, on sides away from the side groove between the pair of side blocks. With the shoulder protrusion and the side protrusion provided on the groove bottoms to extend on the identical straight line, the stone catching avoiding performance can be improved, and the soil discharging performance can be improved. The protrusions are on the identical line means that the width direction center lines of the respective protrusions satisfy the relationship regarding the angle difference and separation distance described above.

In this configuration, the side protrusions provided to the side grooves adjacent to each other in the tire circumferential direction preferably have different lengths. This results in a complicated recess and protrusion shape defined by the blocks and grooves in the side region, which is advantageous in improvement in the driving performance on unpaved roads.

In the present technology, each of the top surfaces of the pair of side blocks included in the block group preferably includes two or three types of regions with different raised heights, and each of the side blocks preferably includes two parts with the regions with different raised heights. With the top surfaces of the side blocks provided with complicated recesses and protrusions, edge components can be increased. This is advantageous in improving the driving performance on unpaved roads.

Here, one of the two or three types of regions with different raised heights with the highest raised height is preferably positioned to be in contact with the narrow groove. With this configuration, an excellent balance can be achieved between the recesses and protrusions on the top surfaces of the side blocks and the recesses formed by the narrow grooves provided to the side blocks. This is advantageous in improvement of the driving performance on unpaved roads.

In an embodiment of the present technology, "tire ground contact edge" is either end portion in a ground contact region in the tire axial direction, which is formed when a regular load is applied to the tire in a state where the tire mounted on a regular rim and inflated to a regular internal pressure is placed vertically on a flat surface. "Regular rim" refers to a rim defined by a standard for each tire according to a system of standards that includes standards with which tires comply, and is a "standard rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). In the system of standards, including standards with which tires comply, "regular internal pressure" is air pressure defined by each of the standards for each tire and is referred to as "maximum air pressure" in the case of JATMA, the maximum value being listed in the table "TIRE LOAD LIMITS AT VARIOUS COLD INFLATION PRESSURES" in the case of TRA, and is "INFLATION PRESSURE" in the case of ETRTO. However, "regular internal pressure" is 180 kPa in a case where a tire is a tire for a passenger vehicle. "Regular load" is a load defined by a standard for each tire according to a system of standards that includes standards on which tires are based, and refers to a "maximum load capacity" in the case of JATMA, refers to the maximum value in the table of "TIRE LOAD LIMITS AT VARIOUS COLD INFLATION PRESSURES" in the case of TRA, and refers to "LOAD CAPACITY" in the case of ETRTO. "Regular load" corresponds to 88% of the loads described above for a tire on a passenger vehicle.

DETAILED DESCRIPTION

Configurations of embodiments of the present technology will be described in detail below with reference to the accompanying drawings.

Figure 1:
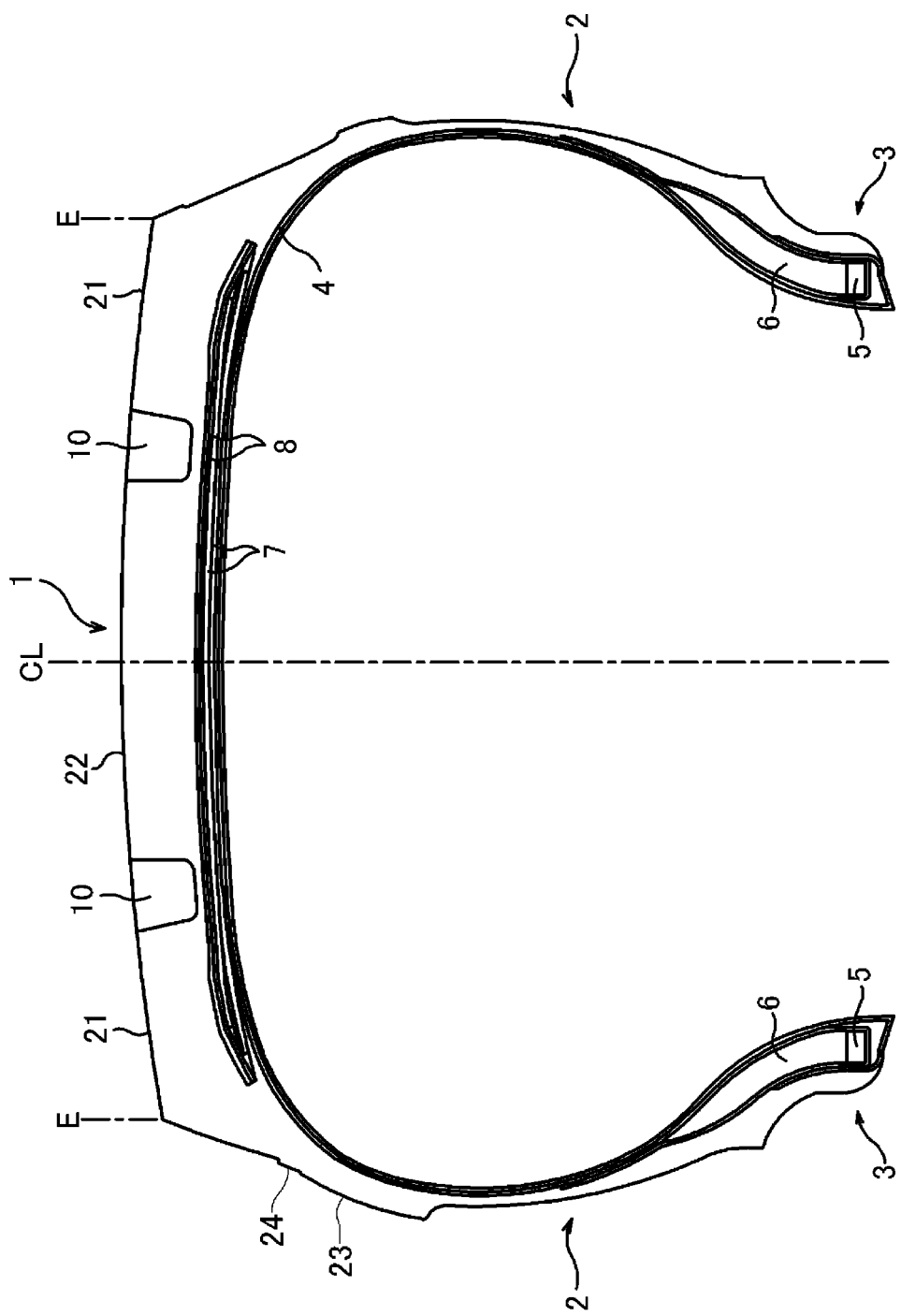
FIG. 1 is a meridian cross-sectional view of a pneumatic tire according to an embodiment of the present technology.

As illustrated in FIG. 1, a pneumatic tire of an embodiment of the present technology includes a tread portion 1, a pair of sidewall portions 2 disposed on both sides of the tread portion 1, and a pair of bead portions 3 disposed in the sidewall portions 2 at an inner side in a tire radial direction. In FIG. 1, reference sign CL denotes a tire equator, and reference sign E denotes a ground contact edge. Additionally, FIG. 1 is a meridian cross-sectional view, and accordingly, although not illustrated, each of the tread portion 1, the sidewall portions 2, and the bead portions 3 extends in the tire circumferential direction to form an annular shape. Thus, the basic structure of the toroidal shape of the pneumatic tire is configured. Although the description using FIG. 1 is basically based on the illustrated meridian cross-sectional shape, all of the tire components each extend in the tire circumferential direction and form the annular shape.

A carcass layer 4 is mounted between the left-right pair of bead portions 3. The carcass layer 4 includes a plurality of reinforcing cords extending in the tire radial direction, and is folded back around a bead core 5 disposed in each of the bead portions 3 from a vehicle inner side to a vehicle outer side. Additionally, bead fillers 6 are disposed on the periphery of the bead cores 5, and each bead filler 6 is enveloped by a main body portion and a folded back portion of the carcass layer 4. On the other hand, in the tread portion 1, a plurality of belt layers 7 (two layers in FIG. 1) are embedded on an outer circumferential side of the carcass layer 4. The belt layers 7 each include a plurality of reinforcing cords that are inclined with respect to the tire circumferential direction, with the reinforcing cords of the different layers arranged in a criss-cross manner. In these belt layers 7, the inclination angle of the reinforcing cords with respect to the tire circumferential direction ranges from, for example, 10° to 40°. In addition, a belt reinforcing layer 8 is provided on the outer circumferential side of the belt layers 7. The belt reinforcing layer 8 includes organic fiber cords oriented in the tire circumferential direction. In the belt reinforcing layer 8, the angle of the organic fiber cords with respect to the tire circumferential direction is set, for example, to from 0° to 5°.

The present technology may be applied to such a pneumatic tire having a general cross-sectional structure; however, the basic structure is not limited to the aforementioned structure.

The present technology relates to a shoulder region and a side region described below. The detailed shape of the tread portion 1 is not limited to the example illustrated in FIG. 2 as long as a tread pattern mainly including blocks suitable for unpaved roads is provided.

Figure 2:
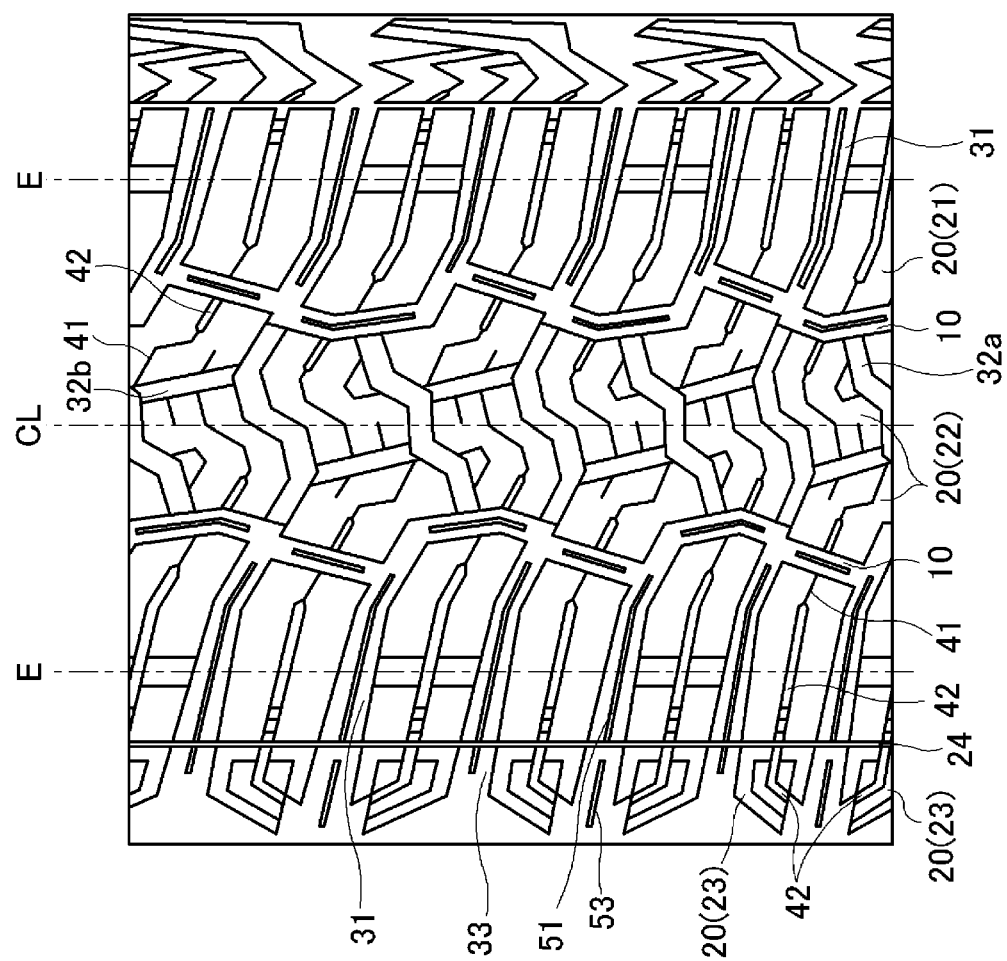
FIG. 2 is a front view illustrating a tread surface of the pneumatic tire according to the embodiment of the present technology.

A surface of the tread portion 1 of the pneumatic tire according to an embodiment of the present technology illustrated in FIG. 2 is provided with a pair of main grooves 10 extending in the tire circumferential direction on both sides of the tire equator CL. These main grooves 10 have a maximum width of, for example, from 9 mm to 20 mm and a groove depth of, for example, from 10 mm to 18 mm. As described below, these main grooves 10 have a zigzag shape in which portions that extend linearly in a predetermined direction are connected via bend points.

The three rows of land portions defined by these main grooves 10 are further defined into blocks 20 by various grooves. Thus, the tread pattern as a whole is obtained as a block pattern mainly including the blocks 20. In the illustrated example, of the plurality of blocks 20, shoulder blocks 21 are defined on the outer side in the tire width direction of a pair of main grooves, and center blocks 22 are defined between the pair of main grooves. The shoulder blocks 21 are defined by shoulder lug grooves 31 extending from the main grooves 10 beyond the ground contact edge E, and a plurality of shoulder blocks 21 are arranged in the tire circumferential direction. The center blocks 22 are defined by center lug grooves 32a that connect the pair of main grooves 10 and extend in the tire width direction and auxiliary grooves 32b that connect the center lug grooves 32a adjacent to each other in the tire circumferential direction, and two rows of center blocks 22 disposed on both sides of the auxiliary grooves 32b are repeatedly arranged in the tire circumferential direction. Sipes 41 and narrow grooves 42 may be optionally provided on the road contact surface of these center blocks 22.

Note that, among the lug grooves that further divide the land portions defined by the main grooves 10 into blocks 20, the groove width of the shoulder lug grooves 31 may be, for example, from 9 mm to 20 mm, and the groove depth may be, for example, from 12 mm to 17 mm, and the groove width of the center lug grooves 32a may be, for example, 7 mm to 13 mm, and the groove depth may be, for example, 11 mm to 14 mm. In particular, the shoulder lug grooves 31 may have the identical groove depth as the main grooves 10. Moreover, the groove width of the auxiliary groove 32b may be, for example, from 7 mm to 10 mm, and the groove depth may be, for example, from 9 mm to 12 mm. Additionally, the optional sipe 41 is a fine groove having a groove width of from 0.5 mm to 2.0 mm, for example, and a groove depth of from 2 mm to 15 mm, for example, and the optional narrow groove 42 is a groove having a groove width and a groove depth that are sufficiently smaller than those of the main grooves 10 and the lug grooves, and the groove width is from 0.5 mm to 4.0 mm, for example, and the groove depth is from 2 mm to 15 mm, for example.

Figure 3:
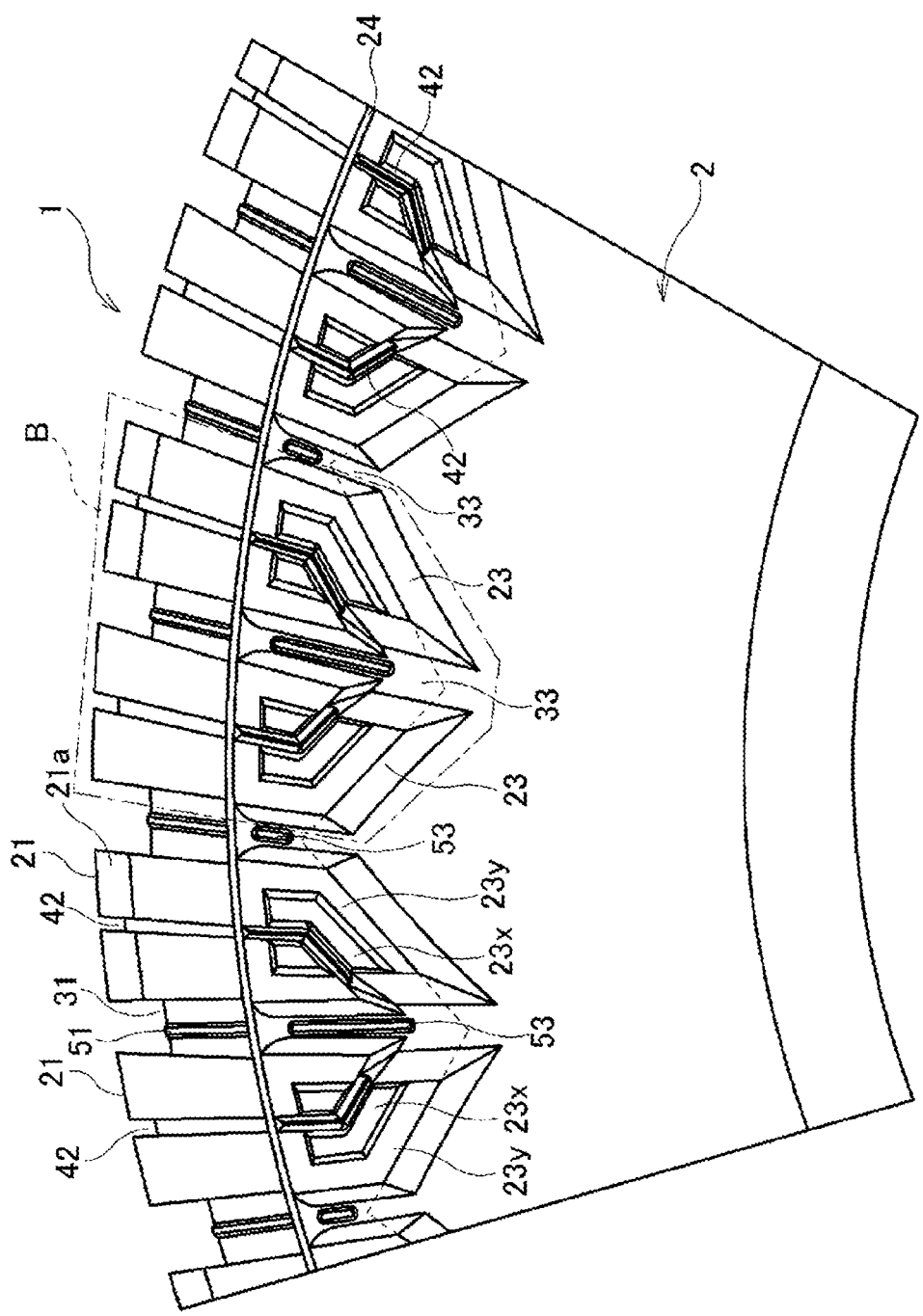
FIG. 3 is an explanatory view illustrating an enlarged main part of the pneumatic tire according to the embodiment of the present technology.
Figure 4:
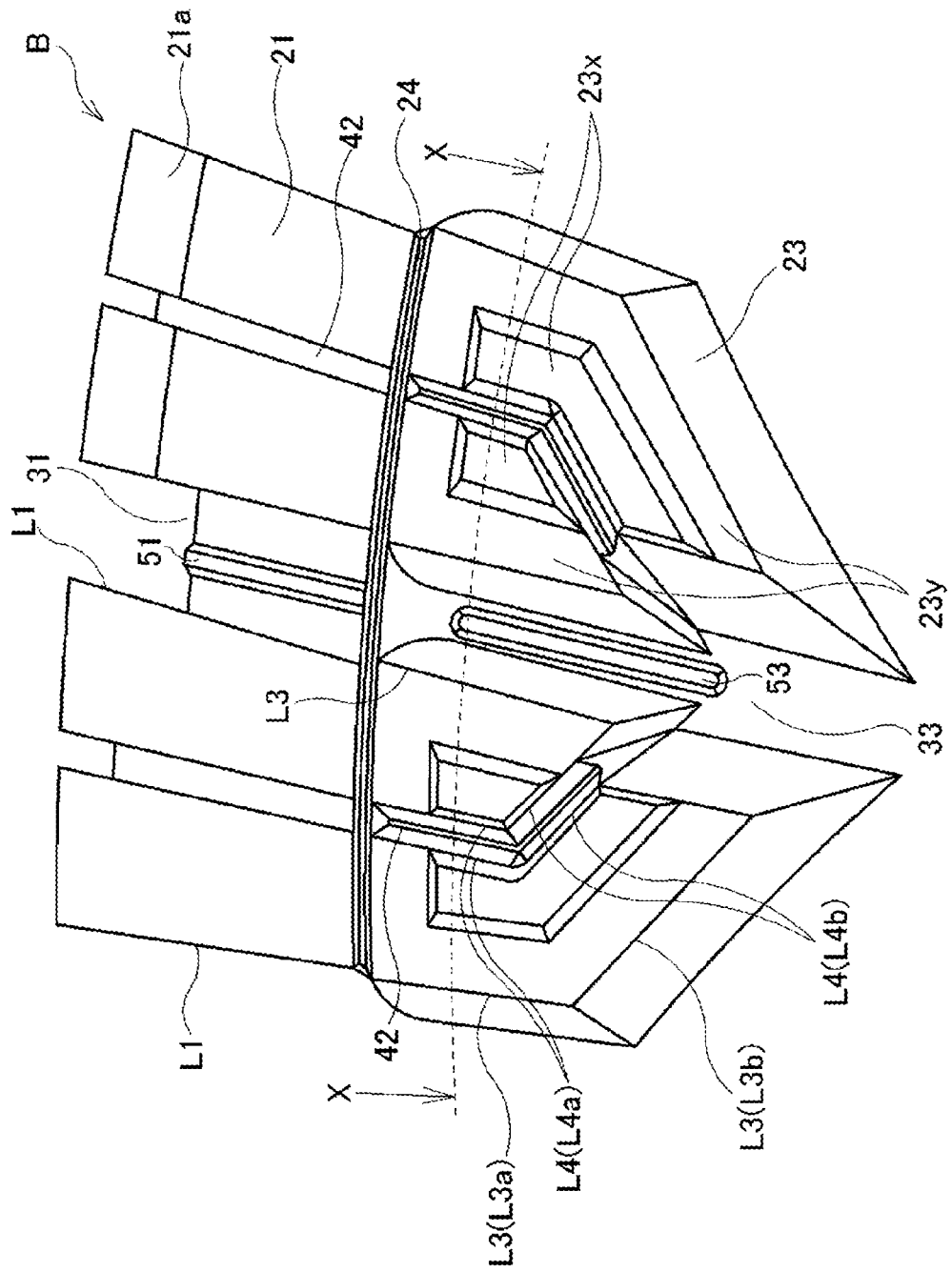
FIG. 4 is an explanatory view illustrating a block group extracted from FIG. 3.

As illustrated in FIGS. 3 and 4, side land portions raised from the outer surface of the sidewall portion 2 are provided in the side regions adjacent to the outer side in the tire width direction of the shoulder regions provided with the shoulder blocks 21. The side land portions are further defined by the side grooves 33 into a plurality of side blocks 23. The side grooves 33 are positioned on extensions of the shoulder lug grooves 31, and extend to substantially continue therefrom. With this configuration, the side blocks 23 are arranged on positions on extensions, on the outer side in the tire width direction, of the shoulder blocks 21. The side block 23 and the side groove 33 are positioned on the outer side in the tire width direction of the shoulder block 21 and the shoulder lug groove 31 as viewed from the contact surface side of the tread portion 1 as illustrated in FIG. 2, and are positioned on the inner side in the tire radial direction of the shoulder block 21 and the shoulder lug groove 31 as viewed from the side of the sidewall portion 2 as illustrated in FIGS. 3 and 4. Note that the groove being positioned on the extension means that the imaginary grooves that are extensions of the grooves in question at least partially overlap in the groove width direction.

The narrow grooves 42 are essentially provided on the side surfaces of the shoulder blocks 21 on the outer side in the tire width direction and the top surfaces of the side blocks 23. These narrow grooves 42 extend on the identical line along the tire width direction. In the illustrated example, a ridge 24 is provided at a boundary between the side surface of the shoulder block 21 on the outer side in the tire width direction and the top surface of the side block 23. Thus, the narrow grooves 42 are divided between the shoulder block 21 and the side block 23, but extend substantially continuously along the tire width direction with the ridge 24 provided in between.

In the present technology, a block group B (see FIG. 4) is used as a single unit, and includes a pair of shoulder blocks 21 adjacent to each other with the shoulder lug groove 31 provided in between, and a pair of side blocks 23 adjacent to each other with the side groove 33 positioned on the extension of the shoulder lug groove 31 between the pair of shoulder blocks 21. The structure of the block group B is specified as described below, and the block groups B with the specific structure are repeatedly arranged entirely along the tire circumferential direction.

In each of the block groups B, a contour line L1 along the shoulder lug groove 31 on the side surface on the outer side in the tire width direction, of the shoulder block 21 and a contour line L3 along the side groove 33 on the top surface of the side block 23 extend on the identical straight line. Of the contour lines L3 along the side groove 33 of the top surface of the side block 23, the contour lines L3 on sides away from the side groove 33 between the pair of side blocks 23 include straight portions L3a and inclined portions L3b. The straight portions L3a are on the side of the shoulder block 21 and extend along the tire radial direction. The inclined portions L3b are connected to the inner side in the tire radial direction of the straight portions L3a, and extend in a converging manner toward the side groove 33 between the pair of side blocks 23. Contour lines L4 of the narrow grooves 42 formed on the side blocks 23 include straight portions L4a and inclined portions L4b. The straight portions L4a are on the side of the shoulder block 21 and extend along the tire radial direction. The inclined portions L4b are connected to the inner side in the tire radial direction of the straight portions L4a, and extend in a converging manner toward the side groove 33 between the pair of side blocks 23.

With the blocks and the grooves (their edges in particular) of the shoulder region and the side region configured as described above, cut resistance can be improved while enhancing soil discharging performance. Specifically, components (the shoulder lug groove 31 and the side groove 33, as well as the narrow groove 42 provided to the shoulder block 21 and the narrow groove 42 provided to the side block 23) extending in the shoulder region and the side region extend on the identical straight line, whereby mud or the like in grooves in the shoulder region and in the side region is efficiently discharged. The contour lines L3 of the side blocks 23 include the straight portions L3a and the inclined portions L3b, so that the side blocks 23 have a tapered shape to be closer to the side groove 33 at a portion more on the inner side in the tire radial direction. Thus, concentration of stress can be avoided and cut resistance can be improved. The contour line L3 of the side block 23 and the contour line L4 of the narrow groove 42 have a similar bent shape defined by the straight portions L3a and L4a and the inclined portions L3b and L4b, whereby excellent edge effect can be provided while maintaining the soil discharging performance.

In this configuration, the straight portions L3a and L4a included in a single side block 23 preferably extend in the same direction with an angle difference relative to the contour line L3 of the side groove 33 on the top surface of the side block 23 being in a range within 10 degrees. The inclined portions L3b and L4b included in a single side block 23 preferably extend in the same direction with an angle difference in a range within 10 degrees. With the straight portions and the inclined portions of the contour lines included in a single side block thus extending substantially parallel with each other, mud or the like in the groove is smoothly discharged, whereby the soil discharging performance can be improved. In any cases, when the angle difference exceeds 10 degrees, the portions would not be substantially parallel with each other, whereby the effect of smoothly discharging mud or the like in the groove cannot be sufficiently obtained.

As illustrated in FIG. 3, a shoulder protrusion 51 is preferably provided on a groove bottom of each shoulder lug groove 31, to be raised from the groove bottom of each shoulder lug groove 31, and extends along the extending direction of each shoulder lug groove 31. Similarly, a side protrusion 53 is preferably provided on a groove bottom of each side groove 33, to be raised from the groove bottom of each side groove 33 and extends along the extending direction of each side groove 33. When these protrusions are provided, the shoulder protrusions 51 and the side protrusions 53 are preferably disposed so as to extend on the identical straight line along the tire width direction. The shoulder protrusion 51 and the side protrusion 53 each have a width that is preferably equal to or larger than 1.5 mm, and is more preferably 1.7 mm to 3.0 mm, and has a raised height that is preferably 3 mm or less, and more preferably 1.0 mm to 2.5 mm. With the shoulder protrusion 51 and the side protrusion 53 provided on respective groove bottoms to extend on the identical straight line, the stone catching avoiding performance of the grooves can be improved, and the soil discharging performance can be improved. The shoulder protrusion 51 and the side protrusion 53 not extending on the identical straight line, that is, the shoulder protrusion 51 and the side protrusion 53 arranged while being misaligned might hinder the flow of mud in the groove, and thus the effect of improving the soil discharging performance becomes difficult to sufficiently achieve. When the width of the shoulder protrusion 51 and the side protrusion 53 is smaller than 1.5 mm, the shoulder protrusion 51 and the side protrusion 53 are too small, and the effect of preventing the stone catching cannot be sufficiently obtained. With the shoulder protrusion 51 and the side protrusion 53 having a raised height exceeding 3 mm, a sufficient groove capacity cannot be maintained, and this might affect the soil discharging performance.

In particular, the side protrusions 53 are preferably shaped while taking the structure of the side blocks 23 as a whole into consideration. Specifically, in the present technology, the side blocks 23 have a tapered shape converging to be closer to the side groove 33 at a portion more on the inner side in the tire radial direction. Thus, a zigzag boundary line (see a dotted line in the figure) is obtained by connecting extensions of the inclined portions L3b included in the contour lines L3, of the contour lines along the side grooves 33 of the top surfaces of the side blocks 23, on the side away from the side groove 33 between the pair of side blocks 23. This boundary line also effectively contributes to the driving performance on unpaved roads due to the zigzag shape. Thus, the side protrusions 53 are preferably terminated to be more on the outer side in the tire radial direction than this boundary line, so as not to ruin the zigzag shape of the boundary line. With the side protrusions 53 thus having a more preferable shape, an effect of improving the stone catching avoiding performance and an effect of improving soil discharging performance can be effectively obtained.

In this configuration, depending on the zigzag shape of the boundary line, the side protrusions 53 provided in the side grooves 33 adjacent to each other in the tire circumferential direction have different lengths. This results in a more complicated recess and protrusion shape defined by the blocks and grooves in the side region, whereby the driving performance on unpaved roads can be effectively improved.

An edge portion on the outer side in the tire width direction of one of a pair of shoulder blocks 21, included in the block group B, positioned on the inner side in the tire width direction of the block pair B may be provided with a scooped portion 21a processed to be a recessed surface shape recessed to be more on the inner side in the tire width direction than the edge portion on the outer side in the tire width direction of the other block. With this configuration, the shape of the edge portion of the shoulder block 21 along the tire circumferential direction is complicated, and this is advantageous in terms of improvement of the driving performance on unpaved roads.

Figure 5:
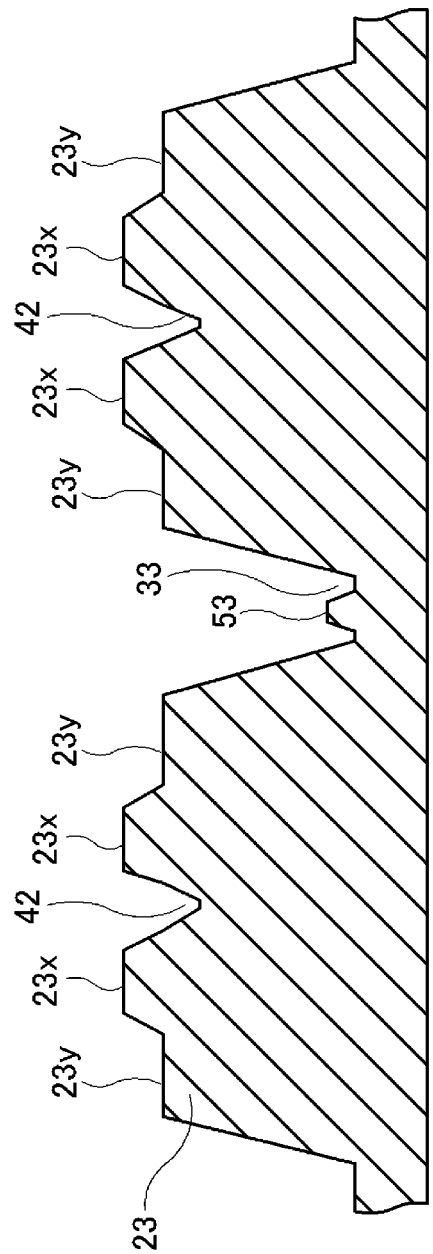
FIG. 5 is a cross-sectional view taken along the line pointed by arrows X-X in FIG. 4.

The top surfaces of the pair of side blocks 23 included in the block group B are preferably uneven, as illustrated in FIGS. 3 to 5, rather than being flat. In particular, the top surfaces of the pair of side blocks 23 included in the block group B each include two or three types of regions with different raised heights. Each side block preferably includes two parts, more preferably, three or four parts where such regions with different raised heights are provided. For example, in the illustrated example, portions 23x with a relatively high raised height and portions 23y with a relatively low raised height are provided on both sides of the narrow groove 42. With the top surfaces of the side blocks 23 provided with complicated recesses and protrusions, edge components can be increased, and this is advantageous in improving the driving performance on unpaved roads. When there are more than three types of regions with different raised heights, each of the regions with different raised heights is small, meaning that sufficient edge effect cannot be obtained in each region. Furthermore, such a configuration is likely to involve partial concentration of stress, which might affect the cut resistance.

With the top surfaces of the side blocks 23 thus provided with recesses and protrusions, one of the two or three types of regions with different raised heights with the highest raised height is preferably positioned to be in contact with the narrow groove 42. For example, in the illustrated example, the portion 23x with a relatively high raised height is in contact with the narrow groove 42. Note that the portion in contact with the narrow groove 42 does not need to have a relatively high raised height as a whole. As illustrated in the figure, a part of the portion 23y with a relatively low raised height (a portion on the side of the shoulder block 21) may be in contact with the narrow groove 42. With such a structure, an excellent balance can be achieved between the recesses and protrusions on the top surfaces of the side blocks 23 and the recesses formed by the narrow grooves 42 provided to the side blocks 23, which is advantageous in improvement of the driving performance on unpaved roads.

As illustrated in FIG. 2, the side blocks 23 described above can provide the effects described above when provided in at least one (the left side region in the illustrated example) of the side regions on both sides in the tire width direction. It is a matter of course that the side blocks 23 described above can be applied to both side regions on both sides in the tire width direction. As illustrated in FIG. 2, the side block 23 described above may be applied to one of the side regions, and a different shape may be used in the other side region, so that one and the other side regions in the tire width direction can be dedicated for achieving different types of performances.

EXAMPLE

Pneumatic tires of 14 types according to Comparative Examples 1 to 4 and Examples 1 to 10 were prepared that have a tire size of LT265/70R17 121Q, have the basic configuration exemplified in FIG. 1, based on the tread pattern illustrated in FIGS. 2 and 3, and each set as in Tables 1 and 2. The items set in Tables 1 and 2 include: positional relationship between a shoulder lug groove and a side groove; positional relationship between a narrow groove (referred to as "shoulder narrow groove" in the tables) formed in a shoulder block and a narrow groove (referred to as "shoulder narrow groove" in the tables) formed on a side block; positional relationship between a contour line (referred to as "lug groove contour line" in the tables) along a shoulder lug groove on a side surface of the shoulder block on the outer side in the tire width direction and a contour line (referred to as "side groove contour line" in the tables) along a side groove on the top surface of the side block; structures of a contour line, of a pair of contour lines along the side groove on the top surface of the side block, on the side away from the side groove between the pair of side blocks, and of a contour line of the narrow groove formed in the side block; an angle difference between straight portions; an angle difference between inclined portions; whether groove bottoms of the shoulder lug groove and the side groove are provided with a protrusion; a width of the protrusion; a raised height of the protrusion; positional relationship between the shoulder protrusion and the side protrusion; whether the top surface of the side block has regions with different raised heights; the types (the number) of regions in the top surface of the side block with different raised heights; and the position of a region, in the top surface of the side block, with a relatively high raised height (referred to as a "high region" in the tables).

In Tables 1 and 2, regarding the positional relationship between the grooves, "position on extension" indicates a case where one of the grooves is positioned on the extension of the other groove, and "misaligned" indicates a case where one of the grooves is not on the extension of the other groove and thus is misaligned. Regarding the positional relationship between the contour lines, "on identical line" indicates a case where one of the contour lines and the other one are on the identical line, and "misaligned" indicates a case where the contour lines are not on the identical line but are arranged while being misaligned. Similarly, regarding the positional relationship between the protrusions, "on identical line" indicates a case where one of the protrusions and the other one are on the identical line, and "misaligned" indicates a case where the protrusions are not on the identical line but are arranged while being misaligned. Regarding the column "structure of contour line" in the tables, "straight+inclined" indicates a case where the contour line includes the straight portion and the inclined portion, and "straight only" includes a case where the contour line includes the straight portion only. Regarding the column "position of high region" in the tables, "narrow groove side" indicates a case where the region with a relatively high raised height is positioned to be in contact with the narrow groove, and "side groove side" indicates a case where the region is positioned away from the narrow groove.

These pneumatic tires are evaluated for startability on an unpaved road and cut resistance using evaluation methods described below. The results are also indicated in Tables 1 and 2.

Startability

The test tires were assembled on wheels having a rim size of 17×8J, inflated to an air pressure of 350 kPa, and mounted on a test vehicle (four wheel drive SUV (sport utility vehicle)), and sensory evaluations on startability were performed by a test driver on unpaved roads (gravel road surfaces). Evaluation results are expressed as index values, with the value of Comparative Example 1 expressed as an index value of 100. Larger index values indicate superior startability on unpaved roads. Note that when the index value is equal to or smaller than "101", there is no substantial difference from the conventional level (Comparative Example 1 as the reference), which means that the effect of improving startability on an unpaved road is not sufficiently obtained.

Cut Resistance

The test tires were assembled on wheels having a rim size of 17×8J, inflated to an air pressure of 350 kPa, and mounted on a test vehicle (four wheel drive SUV). The total cut length was measured after traveling a distance of 1000 km on an off-road durability evaluation road. The evaluation results are expressed as index values with Comparative Example 1 being assigned the value of 100 by using reciprocals of the measurement values. A larger index value indicates a shorter total cut length and excellent cut resistance.

TABLE 1-1

|  |  | Comparative Example 1 | Comparative Example 2 | Comparative Example 3 | Comparative Example 4 |
|---|---|---|---|---|---|
| Positional relationship | Shoulder lug groove/side groove | Position on extension | Position on extension | Position on extension | Position on extension |
|  | Shoulder narrow groove/side narrow groove | Position on extension | Position on extension | Position on extension | Position on extension |
|  | Lug groove contour line/side groove contour line | Misaligned | On identical line | Misaligned | On identical line |
| Structure of contour line |  | Straight only | Straight only | Straight only | Straight only |
| Angle difference | Straight portion | ○ | 15 | 15 | 15 | 0 |
|  | Inclined portion | ○ | — | — | — | — |
| Protrusion | Provided? | No | No | No | No |
|  | Width | — | — | — | — |
|  | Raised height | — | — | — | — |
|  | Positional relationship | — | — | — | — |
| Regions with different raised heights provided? |  | No | No | No | No |
| Types of regions with different raised heights |  | — | — | — | — |
| Position of high region |  | — | — | — | — |
| Startability | Index value | 100 | 100 | 100 | 101 |
| Cut resistance | Index value | 100 | 99 | 100 | 100 |

TABLE 1-2

|  |  | Example 1 | Example 2 | Example 3 |
|---|---|---|---|---|
| Positional relationship | Shoulder lug groove/side groove | Position on extension | Position on extension | Position on extension |
|  | Shoulder narrow groove/side narrow groove | Position on extension | Position on extension | Position on extension |
|  | Lug groove contour line/side groove contour line | On identical line | On identical line | On identical line |
| Structure of contour line |  | Straight + inclined | Straight + inclined | Straight + inclined |
| Angle difference | Straight portion | ○ | 0 | 5 | 10 |
|  | Inclined portion | ○ | 0 | 5 | 10 |
| Protrusion | Provided? | No | No | No |
|  | Width | — | — | — |
|  | Raised height | — | — | — |
|  | Positional relationship | — | — | — |
| Regions with different raised heights provided? |  | No | No | No |
| Types of regions with different raised heights |  | — | — | — |
| Position of high region |  | — | — | — |
| Startability | Index value | 106 | 102 | 103 |
| Cut resistance | Index value | 105 | 105 | 105 |

TABLE 2-1

|  |  | Example 4 | Example 5 | Example 6 | Example 7 |
|---|---|---|---|---|---|
| Positional relationship | Shoulder lug groove/side groove | Position on extension | Position on extension | Position on extension | Position on extension |
|  | Shoulder narrow groove/side narrow groove | Position on extension | Position on extension | Position on extension | Position on extension |
|  | Lug groove contour line/side groove contour line | On identical line | On identical line | On identical line | On identical line |
| Structure of contour line |  | Straight + inclined | Straight + inclined | Straight + inclined | Straight + inclined |
| Angle difference | Straight portion ○ | 0 | 0 | 0 | 0 |
|  | Inclined portion ○ | 0 | 0 | 0 | 0 |
| Protrusion | Provided? | Yes | Yes | Yes | Yes |
|  | Width | 1 | 1.5 | 1 | 1 |
|  | Raised height | 2 | 2 | 2 | 3 |
|  | Positional relationship | On identical line | On identical line | On identical line | On identical line |
| Regions with different raised heights provided? |  | No | No | No | No |
| Types of regions with different raised heights |  | — | — | — | — |
| Position of high region |  | — | — | — | — |
| Startability | Index value | 107 | 107 | 108 | 109 |
| Cut resistance | Index value | 107 | 108 | 107 | 106 |

TABLE 2-2

|  |  | Example 8 | Example 9 | Example 10 |
|---|---|---|---|---|
| Positional relationship | Shoulder lug groove/side groove | Position on extension | Position on extension | Position on extension |
|  | Shoulder narrow groove/side narrow groove | Position on extension | Position on extension | Position on extension |
|  | Lug groove contour line/side groove contour line | On identical line | On identical line | On identical line |
| Structure of contour line |  | Straight + inclined | Straight + inclined | Straight + inclined |
| Angle difference | Straight portion ○ | 0 | 0 | 0 |
|  | Inclined portion ○ | 0 | 0 | 0 |
| Protrusion | Provided? | Yes | Yes | Yes |
|  | Width | 1 | 1 | 1 |
|  | Raised height | 2 | 2 | 2 |
|  | Positional relationship | Misaligned | On identical line | On identical line |
| Regions with different raised heights provided? |  | No | Yes | Yes |
| Types of regions with different raised heights |  | — | 2 | 2 |
| Position of high region |  | — | Narrow groove side | Side groove side |
| Startability | Index value | 108 | 110 | 110 |
| Cut resistance | Index value | 107 | 109 | 108 |

As can be seen in Tables 1 and 2, any of Examples 1 to 10 achieved effective improvement of startability on the unpaved road and cut resistance, compared with Comparative Example 1. In addition, only the startability on gravel road surfaces was evaluated. However, even in the case of driving on other unpaved roads (mud roads, rocky areas, snowy roads, and the like), the tire according to an embodiment of the present technology effectively works for mud, rocks, snow, and the like on road surfaces and thus can exert excellent starting performance.

On the other hand, in Comparative Examples 2 and 3, because there is a portion in which the contour lines are misaligned instead of being on the identical line, the effect of improving startability on unpaved roads and cut resistance failed to be sufficiently obtained. In Comparative Example 4, the contour line, of the contour lines along the side grooves of the top surface of the side blocks, on a side away from the side groove between the pair of side blocks and the contour lines of the narrow grooves formed on the side blocks include the straight portions only. Thus, the effect of improving startability on unpaved roads and cut resistance failed to be sufficiently obtained.

The invention claimed is:

1. A pneumatic tire, comprising:
a tread portion extending in a tire circumferential direction and having an annular shape;
a pair of sidewall portions respectively disposed on both sides of the tread portion; and
a pair of bead portions each disposed on an inner side of the pair of sidewall portions in a tire radial direction,
the tread portion having a surface provided with a pair of main grooves on both sides of a tire equator that extend along the tire circumferential direction,
shoulder regions, positioned on an outer side in a tire width direction of the main grooves, being provided with a plurality of shoulder lug grooves that are provided at an interval in the tire circumferential direction and extend from the main grooves toward the outer side in the tire width direction, and a plurality of shoulder blocks that are defined by the main grooves and the shoulder lug grooves and are arranged along the tire circumferential direction,
side regions that are adjacent to outer sides in the tire width direction of the shoulder regions being provided with a plurality of side grooves that are extensions of the respective shoulder lug grooves and extend along the tire radial direction and a plurality of side blocks that are defined by the side grooves on the outer side in the tire width direction of each of the shoulder blocks and are raised from outer surfaces of the sidewall portions,
side surfaces of the shoulder blocks on the outer side in the tire width direction and top surfaces of the side blocks each being provided with narrow grooves extending in the tire radial direction and having groove widths narrower than groove widths of the shoulder lug grooves, the narrow grooves on the side surfaces of the shoulder blocks on the outer side in the tire width direction and on the top surfaces of the side block extending on identical straight lines,
in each of block groups including a pair of shoulder blocks adjacent to each other with a shoulder lug groove provided in between and a pair of side blocks adjacent to each other with a side groove positioned on an extension of the shoulder lug groove between the pair of shoulder blocks provided in between, contour lines of side surfaces of the shoulder blocks on the outer side in the tire width direction and along the shoulder lug groove and contour lines of the top surfaces of the side blocks and along the side groove extending on identical straight lines, wherein
of the contour lines of the top surfaces of the side blocks and extending along the side grooves, contour lines on a side away from the side groove between the pair of side blocks and contour lines of the narrow grooves formed on the side blocks each including:
straight portions extending along the tire radial direction on a side of the shoulder blocks, and
inclined portions connected to the inner side in the tire radial direction of the straight portions and extending in a converging manner toward the side groove between the pair of side blocks, and
the block groups being repeatedly arranged over an entire circumference.

2. The pneumatic tire according to claim 1, wherein the straight portions included in each of the side blocks extend in an identical direction with a contour line of the top surface of the side block on a side of the side groove with an angle difference in a range within 10 degrees, and the inclined portions included in each of the side blocks extends in an identical direction with an angle difference in a range within 10 degrees.

3. The pneumatic tire according to claim 2, wherein
a groove bottom of each of the shoulder lug grooves is provided with a shoulder protrusion that is raised from the groove bottom of each shoulder lug groove and extends along an extending direction of each shoulder lug groove,
a groove bottom of each of the side grooves is provided with a side protrusion that is raised from the groove bottom of each side groove and extends along an extending direction of each side groove, the shoulder protrusion and the side protrusion extends on an identical line along the tire width direction,
the shoulder protrusion and the side protrusion each have a width that is equal to or larger than 1.5 mm and a raised height that is equal to or smaller than 3 mm, and
the side protrusion is terminated to be more on the outer side in the tire radial direction than a zigzag boundary line formed by connecting extensions of the inclined portions included in contour lines, of the contour lines of the top surfaces of the side blocks along the side groove, on sides away from the side groove between the pair of side blocks.

4. The pneumatic tire according to claim 3, wherein the side protrusions provided to the side grooves adjacent to each other in the tire circumferential direction have different lengths.

5. The pneumatic tire according to claim 4, wherein each of the top surfaces of the pair of side blocks included in the block group includes two or three types of regions with different raised heights, and each of the side blocks includes two parts with the regions with different raised heights.

6. The pneumatic tire according to claim 5, wherein of the two or three types of region with different raised heights, a region with highest raised height is positioned to be in contact with the narrow groove.

7. The pneumatic tire according to claim 1, wherein
a groove bottom of each of the shoulder lug grooves is provided with a shoulder protrusion that is raised from the groove bottom of each shoulder lug groove and extends along an extending direction of each shoulder lug groove,
a groove bottom of each of the side grooves is provided with a side protrusion that is raised from the groove bottom of each side groove and extends along an extending direction of each side groove, the shoulder protrusion and the side protrusion extends on an identical line along the tire width direction,
the shoulder protrusion and the side protrusion each have a width that is equal to or larger than 1.5 mm and a raised height that is equal to or smaller than 3 mm, and
the side protrusion is terminated to be more on the outer side in the tire radial direction than a zigzag boundary line formed by connecting extensions of the inclined portions included in contour lines, of the contour lines of the top surfaces of the side blocks along the side groove, on sides away from the side groove between the pair of side blocks.

8. The pneumatic tire according to claim 7, wherein the side protrusions provided to the side grooves adjacent to each other in the tire circumferential direction have different lengths.

9. The pneumatic tire according to claim 1, wherein each of the top surfaces of the pair of side blocks included in the block group includes two or three types of regions with different raised heights, and each of the side blocks includes two parts with the regions with different raised heights.

10. The pneumatic tire according to claim 9, wherein of the two or three types of region with different raised heights, a region with highest raised height is positioned to be in contact with the narrow groove.

* * * * *